2,901,859
CRAB TRAPS
Carl Hansen, St. Albans, N.Y.

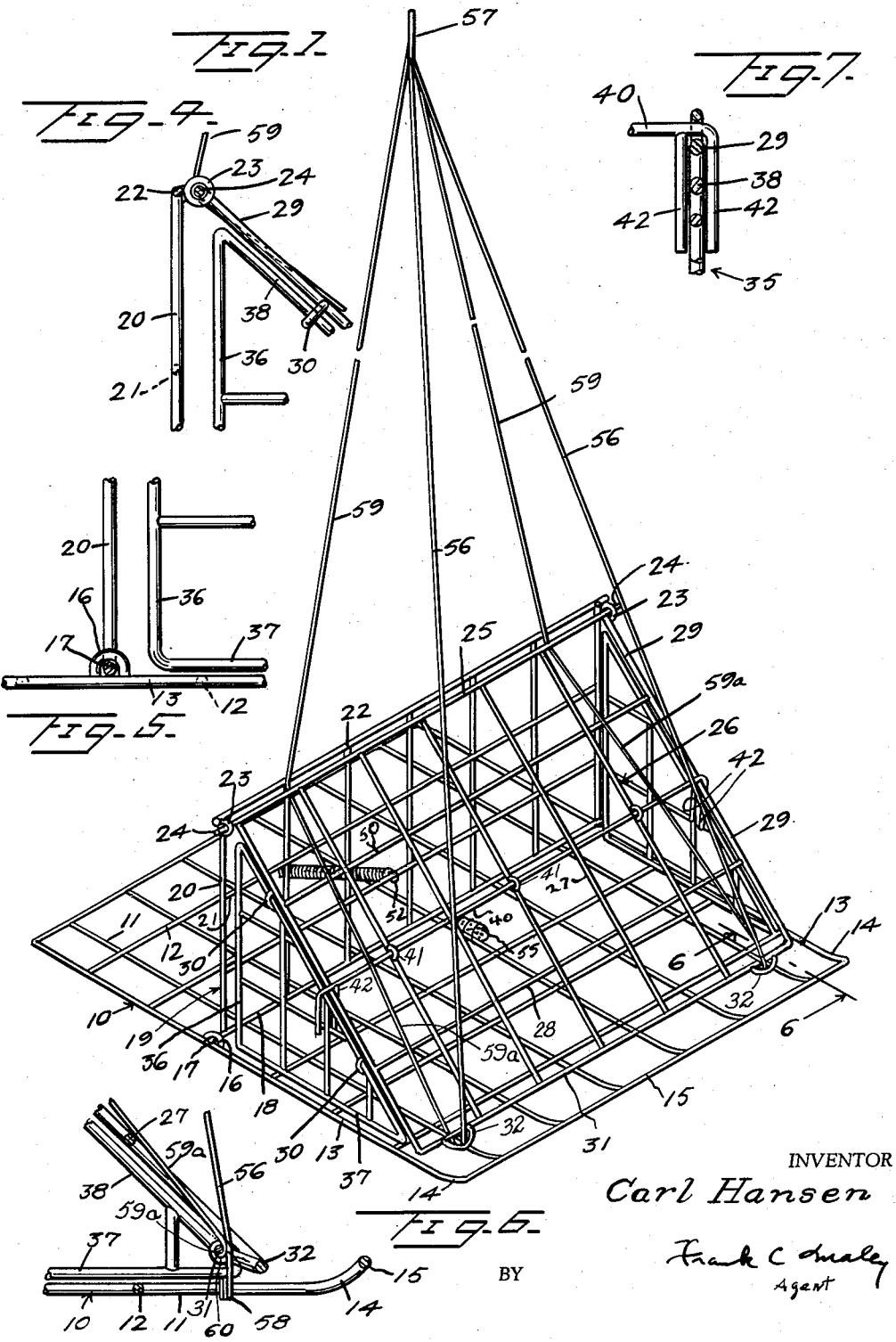

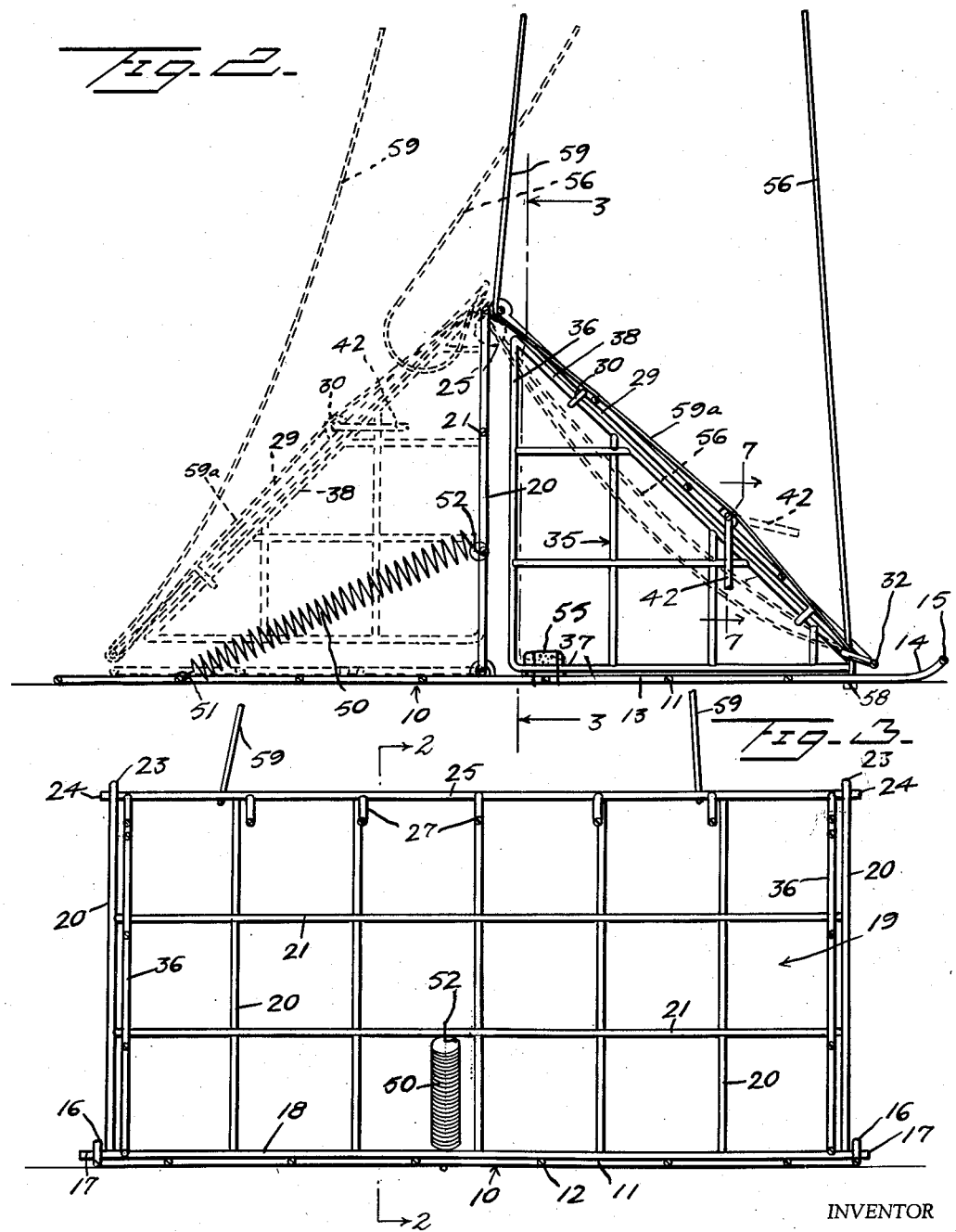

Application June 13, 1958, Serial No. 741,780

8 Claims. (Cl. 43—105)

This invention relates to a crab trap or trap for similar bottom dwelling crustaceans or the like, and is an improvement over my prior Patent No. 2,787,861, granted me on April 9, 1957.

A primary object of this invention is the provision of an improved crab trap which is adapted to be supported by a plurality of cords or wires, and which will when so supported be maintained in closed position, but which will automatically be moved to open or set position when seated on the bottom of a body of water.

An additional object of the invention is the provision of such a trap formed of suitable foraminous material which will facilitate the raising and lowering of the same through the water.

An additional object of the invention is the provision of such a trap which may be readily folded to flat condition to facilitate transportation and storage of the same.

Still another object of the invention is the provision of a device of this character provided with means whereby the folding sides thereof may be retained in unfolded or operative position.

An additional object of the invention is the provision of such a trap which may be left on the bottom, and which, when suitably baited will attract large numbers of crustaceans to the bait, and which will, upon lifting of the trap be automatically moved to closed or trapping position.

Still another object of the invention resides in the provision of a device of this character which is sturdy and durable in construction, reliable and efficient in operation, and relatively simple and inexpensive to manufacture, assemble and utilize.

Still other objects reside in the combinations of elements, arrangements of parts, and features of constructions, all as will be more fully pointed out hereinafter and disclosed in the accompanying drawings.

In the drawings:

Figure 1 is a perspective view of one form of trap embodying features of the invention shown in suspended closed or trapping position.

Figure 2 is a side elevational view of the device of Figure 1, shown in full lines in closed position, and in dotted lines in open position.

Figure 3 is a sectional view taken substantially along the line 3—3 of Figure 2 as viewed in the direction indicated by the arrows.

Figure 4 is an enlarged fragmentary elevational view of a constructional detail.

Figure 5 is a view similar to Figure 4, but showing a different constructional detail.

Figure 6 is an enlarged fragmentary sectional view taken substantially along the line 6—6 of Figure 1 as viewed in the direction indicated by the arrows.

Figure 7 is an enlarged sectional view taken substantially along the line 7—7 of Figure 1 as viewed in the direction indicated by the arrows.

Similar reference characters refer to similar parts throughout the several views of the drawings.

Having reference now to the drawings in detail, the device of the instant invention comprises a base member generally indicated at 10, which is preferably formed as a grid or perforated member comprised of longitudinally extending wires 11 and transversely extending wires 12, although if desired the device may be made of suitable screen, or perforated plastic or other material suitable for the purpose. The base member 10 includes outer longitudinally extending side members 13, which are bent upwardly as at 14, adjacent one end thereof, and connected by a transverse end member 15, forming a slightly arcuately upcurved lip. The longitudinally extending wire members 11 are also slightly curved upwardly to conform to the configuration of the outer members 13.

The side members 13 are provided at approximately their midpoint with aligned eyes 16, which accommodate the projecting ends 17 of a lower wire or axle of a grid generally indicated at 19, which comprises the rear wall of the trap. The grid 19 is comprised of normally vertically extending wires 20 and transverse wires 21. The wires may be suitably connected as by welding or the like, as are the eyes 16 of the members 13.

The top wire 22 of the grid 19 has eyes 23 formed at the extremities thereof, through which project the extending ends 24 of a wire 25, which forms the top bar of a closure grid or perforated number generally indicated at 26, which includes longitudinally extending wires 27, and transverse wires 28, similar to the longitudinal and transversely extending wires of the previously described modification.

The grid 26, or trap closure also includes side members 29, which extend longitudinally thereof, and upon which at their outer sides are secured spaced eyes 30, the purpose of which will be more fully described hereinafter. The lower bar or wire 31 of the grid 26 is also provided adjacent its ends with eyes 32, also for a purpose to be more fully described hereinafter.

Triangular side grids or perforated members generally indicated at 35 include an end wire 36, which is adapted to extend in parallelism with the end wires 20 of the grid 19, and a lower wire 37, which is adapted, in one position of adjustment, as shown in Figures 1 and 2 to extend parallel to the longitudinally extending side wire 13 of the grid 10. An angularly disposed wire 38 extends between the extremities of the wires 36 and 37, and through the eyes 30, pivotally to mount the triangular sections or grids 35 for swinging movement relative to the end wires 29 of the grid 26.

In order to hold the triangular side grids 35 in the position as indicated when the trap is ready for use, a transverse wire or bar 40 is extended through suitable eyes 41, formed on selected ones of longitudinally extending wires 27 or grid 26. The ends of a wire 40 are provided with pairs of right angularly disposed spaced apart wires 42, which, when the trap is in its operative position are adapted to be swung downwardly as indicated at Figures 1 and 2 for the purpose of holding the triangular side grids 35 against pivotal movement about the axis formed by the wire 38.

Obviously rotation of the wire 40 will release the engagement of the fingers 42 with the grids 35, and permit the same to be folded inwardly for folding the trap when not in use, as will be described more fully hereinafter.

A coiled spring 50 is attached at one end 51 to one of the transverse bars 12 of the base 10, on the side thereof away from the end member 15, and beyond the eyes 16, and connected at its other end 52 to an intermediate transverse wire 21 of grid 19, so as to bias the grid 19 to the dotted line position shown in Figure 2, or flat against the base 10. When in this position, the grid 26 is inclined upwardly, so that its open face faces toward the lip formed by the arcuate portions 14 of the longitudinally extending wires 11 and 13, providing an enclosure into which a crustacean may crawl, while the trap is on the bottom of a body of water. A suitable bait holder 55 of any desired type is adapted to be positioned at an intermediate point on the base 10 for the purpose of attracting crustaceans into the trap when the same is set or in open position.

Means are provided which automatically serve to close the trap by virtue of its own weight, when the same is raised from the bottom, and such means take the form of a pair of front cords 56, which extend from a common lift cord 57 downwardly through the eyes 32, and are secured as at 58 to the forward portion of the outermost of longitudinal wires 11.

Additional cords 59 also extend from the lift cord 57 downwardly between the wires 22 and 25, and thence forwardly as indicated at 59a along the under side of grid 26, and are secured as at 60 to the eyes 32.

From the foregoing the operation of the device should now be readily understandable. When the device is resting on the bottom, and no lift or force is exerted on the cord 57 the spring 50 will draw the grid 19 to the dotted line position of Figure 2, or flat against the base 10, so that the open portion of the trap will be exposed, that is with the member 31 upwardly, in order to provide access to the bait 55 from one direction only, an enclosure being formed by the grid 26 and the side grids 35. Upon the exertion of lifting pressure on the cord 57 an equal pressure will be exerted on the cords 56, so that pressure will be exerted against the wire member 25, to lift the grid 19, through the connection of eyes 23 and ends 24 to the vertical position shown in Figure 1 in full lines and Figure 2. This operation will cause the wire member 31 to be positioned closely adjacent the front end or wire 15 of base 10, forming an enclosure, which will serve to trap the crabs or other crustaceans or the like which have been attracted by the bait.

Obviously as long as the weight of the trap is supported by the lift cord 57, the trap will remain in the closed position, but as soon as the base 10 is placed on a surface spring 50 will automatically open the trap so that the contents thereof may be emptied and the trap rebaited. Equally obviously when it is desired to use the trap again, as soon as it settles to the bottom, and the tension on the lines is relaxed, the trap will automatically reset itself for reuse.

When it is desired to store or ship the trap, the wire 40 is merely rotated to release the fingers 42 from their engagement with the sides of the grids 35, the latter then being folded inwardly, and the spring will serve to fold the grid 19 and the grid 26 into flat position over the triangular grid 45, so that the device may be readily fitted into a comparatively small space.

From the foregoing it will now be seen that there is herein provided an improved crab trap or the like, which accomplishes all of the objects of this invention, and others, including many advantages of great practical utility and commercial importance.

As many embodiments may be made of this inventive concept, and as many modifications may be made in the embodiment herein before shown and described, it is to be understood that all matter herein is to be interpreted merely as illustrative, and not in a limiting sense.

What is claimed is:

1. In a crab trap, the combination of a flat base, a trap closure member extending transversely across the center of said base and pivoted thereto, a second trap closure member pivotally secured to the free end of said first trap closure member, triangular side perforated members pivtotally connected to the edges of said second trap closure member, a spring connected between an intermediate point of said base and said first trap closure member serving to bias said first trap closure member to flat position relative to said base and lift cord means to lift said first trap closure member to a position perpendicular to said base when the weight of said trap is suspended by said lift cord, said triangular perforate side members holding said second trap closure member at an actute angle relative to said first closure member whereby when said first trap closure member is in said perpendicular position the free edge of said second trap closure member abuts said base to form, with said first closure member and said triangular side plates, a closed trap.

2. In a crab trap, the combination of a flat base, a trap closure member extending transversely across the center of said base and pivoted thereto, a second trap closure member pivotally secured to the free end of said first trap closure member, triangular side perforate members pivotally connected to the edges of said second trap closure member, a spring connected between an intermediate point of said base and said first trap closure member serving to bias said first trap closure member to flat position relative to said base and lift cord means to lift said first trap closure member to a position perpendicular to said base when the weight of said trap is suspended by said lift cord, said triangular side perforate members holding said second trap closure member at an acute angle relative to said first closure member whereby when said first trap closure member is in said perpendicular position the free edge of said second trap closure member abuts said base to form, with said first closure member and said triangular side perforate members, a closed trap, and means for holding said side perforate members in a plane perpendicular to the planes of both said first and second trap closure means.

3. The structure of claim 2 wherein said base and said first and second trap closure members comprise foraminous grids.

4. The structure of claim 2 wherein release of said means for holding said side perforate members permits said side perforate members to be pivoted to a position in a plane parallel to said second trap closure members and said second trap closure member to be pivoted to a plane parallel to said first trap closure member, to provide a relatively flat article to facilitate storage when not in use.

5. The structure of claim 2 wherein said lift cord comprises a pair of front cords connected to the edge of said base adjacent the free end of said second trap closure member when in closed position, a pair of rear cords connected to the free edge of said second trap closure member and extending beneath said second trap closure member to its pivot point with said first trap closure member, and a common lift cord adapted to be connected at a common point to said front and rear cords.

6. The structure of claim 5 wherein guide eyes are provided for said front cords on the free edge of said second trap closure member.

7. The structure of claim 2 wherein the means for holding said side perforate members comprises a wire extending transversely of and pivoted to said second trap closure member and a pair of spaced perpendicular fingers at each end of said wire, said pairs of fingers extending in one position of adjustment, on either side of each side perforate member.

8. The structure of claim 2 including a bait holder disposed at the junction of said first and second trap closure members.

References Cited in the file of this patent
UNITED STATES PATENTS
2,787,861    Hansen  ------------ Apr. 9, 1957